Feb. 27, 1945.   F. H. LE JEUNE   2,370,361
COUNTERBALANCE FOR WHEELS
Filed June 26, 1943   2 Sheets-Sheet 1
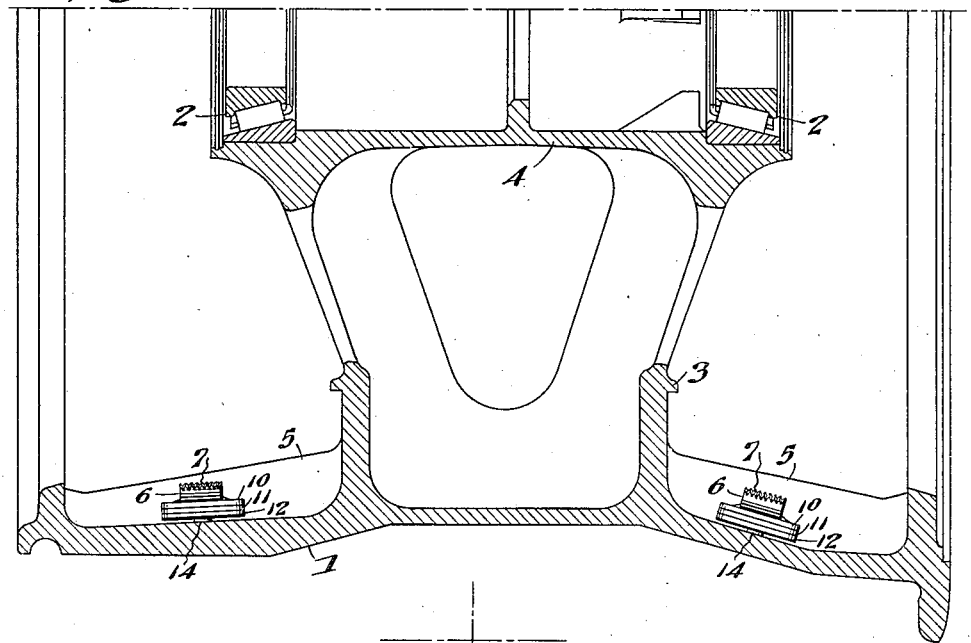
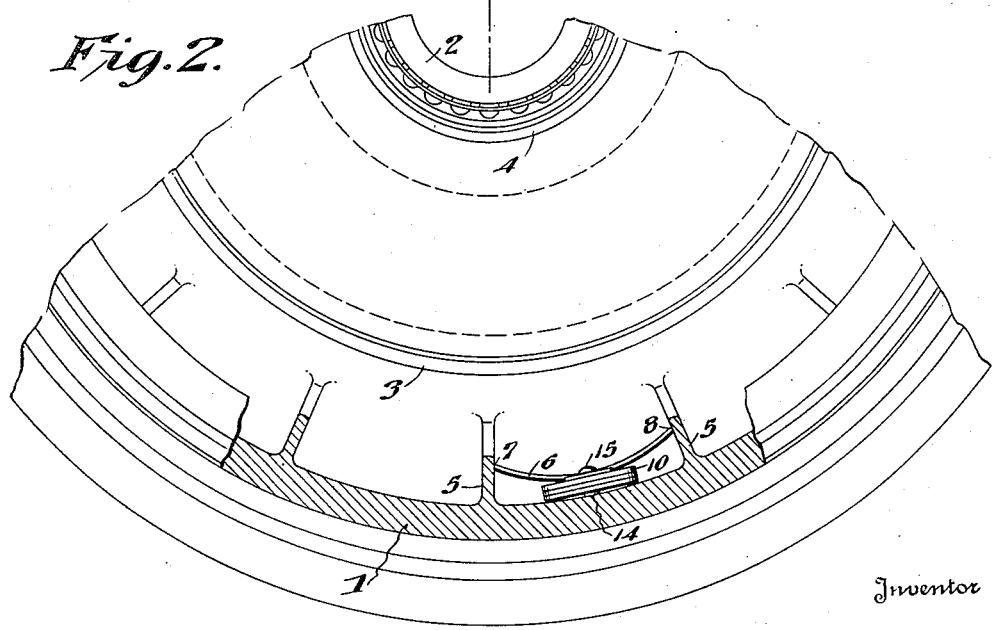
Inventor
FRANK H. LE JEUNE
By Beaman & Leinford
Attorney Feb. 27, 1945.  F. H. LE JEUNE  2,370,361
COUNTERBALANCE FOR WHEELS
Filed June 26, 1943   2 Sheets-Sheet 2
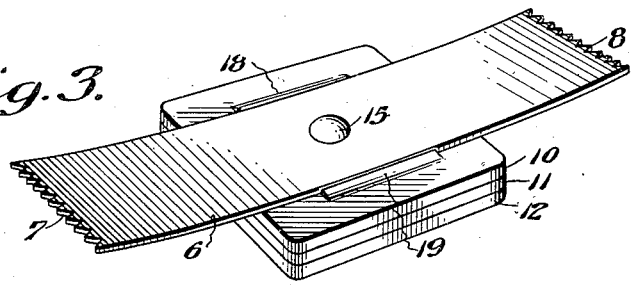
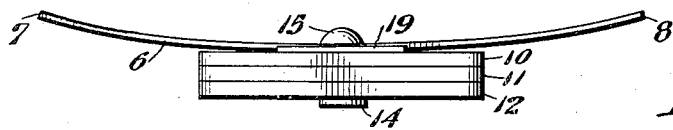
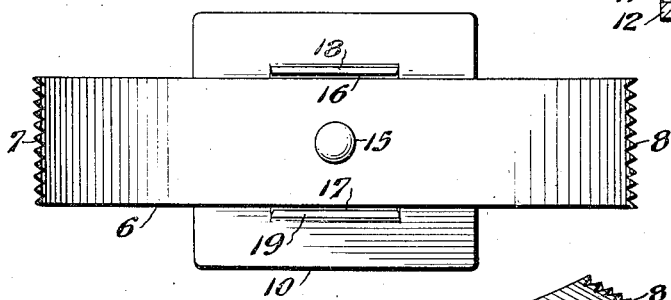
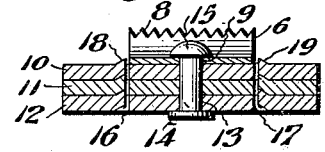
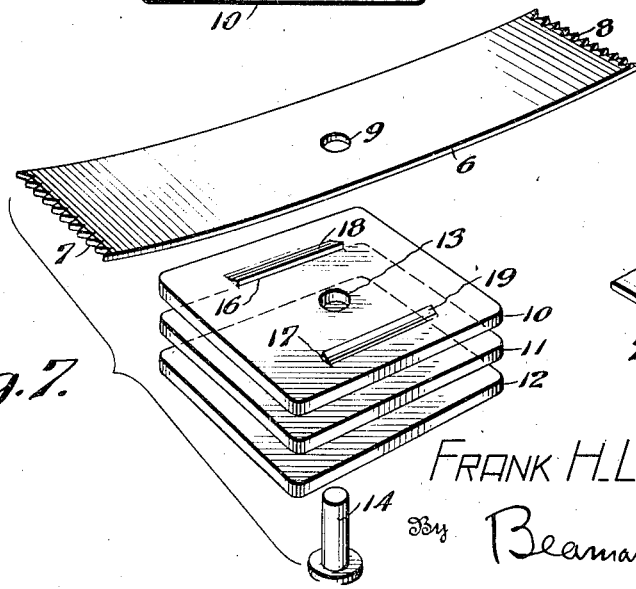
Inventor
FRANK H. LE JEUNE
By Beaman & Lawford
Attorney Patented Feb. 27, 1945

2,370,361

UNITED STATES PATENT OFFICE 2,370,361

COUNTERBALANCE FOR WHEELS

Frank H. Le Jeune, Jackson, Mich., assignor to Hayes Industries, Inc., Jackson, Mich., a corporation of Michigan Application June 26, 1943, Serial No. 492,439

10 Claims. (Cl. 301—5)

This invention relates to wheel counterbalances, and particularly to counterweight means adapted to be detachably and adjustably mounted upon a wheel for balancing the unbalanced forces of wheel assemblies such as used upon automobiles, trucks, airplanes, and the like.

In wheel and tire assemblies of this nature, there will be certain portions of the rotating parts, such as the wheel including the rim and hub and associated parts, the tire and tube, and the brake drum, which may be out of balance, and when such an unbalanced wheel assembly is rotated the lack of balance will set up forces interfering with proper rotation and efficient operation of the wheel. Therefore, it is a primary purpose of this invention to provide means for balancing wheel assemblies whereby the counterbalance weight is applied and is distributed in a manner to balance the wheel upon its axis of rotation so that the forces tending to cause twisting or wobbling will be counteracted or counterbalanced.

Another object is to provide means of this character that can be simply and inexpensively manufactured with all of the parts made up as stampings, possibly from scrap material, and with which the several parts are quickly and readily assembled by simple and ordinary operations not requiring other than ordinary equipment, or necessitating special skilled manual operations.

A further object is to so construct the wheel counterbalancing device that the parts thereof can be made up as substantially identical stampings, whereby the commercially produced counterbalances will be substantially uniform in size and accurate for weight.

Another purpose is to provide means of this character which can be easily applied directly to cast steel and other types of wheels, without the use of bolts or screws or other fastenings, and which can be fitted in place or applied by hand without the necessity of employing any tool or special implement and without requiring contact with or adjustment to a tire or any part thereof.

Still another purpose is to provide a structure of this character permitting the counterbalance weights to be made in different weights as required, the variation of the weight being readily accomplished by increasing or decreasing the number of weight stampings as included in the counterbalance means as assembled.

With the above and other objects in view, some of which will be apparent to those skilled in the art, and others of which are inherent in the construction and assembly of the parts and in the use of the device, this invention includes certain novel features which will be pointed out in connection with the drawings and will then be set forth in the claims.

In the drawings:

Figure 1 is a fragmentary radial sectional view through a wheel structure illustrating an embodiment of my invention applied to and in use thereon.

Fig. 2 is a fragmentary side elevational view of the wheel, with parts in section, to better disclose the embodiment of the invention.

Fig. 3 is an enlarged perspective view showing an assembled counterbalance weight in accordance with my invention.

Fig. 4 is a view in side elevation.

Fig. 5 is a top plan view.

Fig. 6 is a transverse sectional view.

Fig. 7 is a perspective view showing the several parts grouped somewhat in the order of their manner of assembly.

Fig. 8 is a fragmentary perspective view showing a modified embodiment.

Referring more particularly to the drawings, Figs. 1 and 2 illustrate generally the adaptation and application of this invention to a metal wheel, which disclosure can be taken as typically illustrative of a wheel structure to which this invention is applicable. The wheel, as here somewhat sketchily shown, has an annular rim portion 1 adapted to mount a tire in usual manner, and the wheel will be rotatably mounted on its axis through the medium of bearings 2, or in any other suitable manner. The supporting portions 3 are provided between the hub 4 and the rim 1, and webs or ribs 5 are arranged or disposed substantially as spokes or spoke-like reinforcements around and in substantially radially inwardly extending relation within the annular rim 1. These webs or ribs are illustrated as being provided to extend inwardly from the rim adjacent to both edges thereof, and the wheel as illustrated in the disclosure is of a standard type and construction, ordinarily a cast wheel; however, this disclosure is intended only as illustrative, and the present invention is adaptable for and applicable to various types or constructions of wheels as now manufactured or well-known and having webs or ribs or spoke-like portions extending inwardly from an annular rim.

The mounting member 6 can be made up from an elongated spring member, as for instance a strip of spring metal, and this mounting member is of an overall or developed length greater than the distance between two adjacent webs or ribs 5, or such spoke-like portions. As shown, the ends 7 and 8 of the mounting member 6 are notched or made of toothed or serrated formation, and this member 6 is preferably somewhat curved or bowed. The member 6 has an opening 9 formed through its middle portion.

The weight members, of which three are shown at 10, 11 and 12, are substantially identical or uniform stampings of sheet metal or other suitable material, and these parts can therefore be commercially produced to be of substantially uniform or equal weight. The weight members are made of somewhat greater width than the mounting member 6, and are of less length than this member. Each weight member is provided in its middle portion with an opening 13, the several weight members to be assembled in stacked relation with the openings 13 thereof in alignment and in registry with the opening 9 of the mounting member, and then a rivet or pin fastening 14 is inserted through these openings and is headed over, as at 15, to secure the parts together and in assembled relation. As stated, the several weight members are of greater width than the transverse dimension of the mounting member 6, and the weight members are provided on opposite sides of the mounting member 6 with parallel lanced or pierced portions 16 and 17, the material of the weights outside of these lanced or pierced openings being bent upwardly, as at 18 and 19, to provide rib-like extensions that will interengage between the several weight members, and will engage on opposite sides of the mounting member 6 to hold the several weight members and the weight portion assemblage against turning with relation to each other and to the mounting member or spring 6.

In the present instance a flat headed rivet 14 is illustrated as being inserted upwardly through the openings 13 of the several weight members so that the head of the rivet is presented on the under side of the lowermost weight member, and the shank of the rivet is illustrated as being headed over, at 15, on the upper side of the elongated mounting or spring member 6; but, it will be appreciated that the rivet or fastening 14 can be applied in various other ways as now well-known, and if the headed portion at either end of the rivet be objectionable, this can be substantially eliminated or flattened out to offer little if any projection. Further, in place of the solid fastening, a tubular rivet might be employed.

In the use of this invention, the assembled structure is located adjacent to the annular rim 1 of the wheel with the weight portion between two adjacent webs or ribs or spoke-like portions 5, and then when pressure is exerted against the counterbalance weight structure, the spring mounting member 6 will be bowed to permit the ends 7 and 8 thereof to pass downwardly between and against the opposed sides of the adjacent webs or ribs 5. The counterbalance weight can be fitted and applied by hand, and when pressed into place with the weight portion bearing against the inner side of the rim 1, the ends 7 and 8 of the spring mounting member 6 will engage with the opposed faces of the adjacent webs or ribs 5 and will hold the counterbalance weight in place and against movement or displacement. The spring mounting member 6 will exert yielding force to retain the weight portion in contact with the inner face of the rim 1, and as the developed or unsprung length of the mounting member 6 is greater than the distance between the opposed faces of the adjacent web or rib member 5, the device will be securely held in place and will be retained against accidental or casual displacement.

In the modified showing in Fig. 8, the mounting or spring member 6' has the end 7' thereof substantially squared or plain, without serrations or toothed formations or any other holding contour, and it will be understood that the ends 7 and 8 can be made in this manner, or can be shaped or contoured to any desired form.

Also, the mounting member or spring 6 can be bowed or curved to a greater or lesser extent than here illustrated, and can be made partially or entirely flat throughout its length, and the parts will yet function due to the fact that the spring member 6 will be bowed when force is applied to spring the ends thereof between the webs or ribs.

As has been stated, the spring 6 is longer than the distance between the spoke-like ribs or radially extending portions 5 of the wheel, and when the device is fitted in place the spring will therefore be deflected until the ends will go between the ribs. This deflection provides the necessary spring tension to hold the weight stampings against the inner side of the wheel rim, and also to resist displacement or loosening of the spring itself.

Obviously, a greater or lesser number of the weight members 10, 11 and 12 can be employed to vary the weight as required, and these weight members can be made of greater or lesser length and width and can be differently shaped or contoured. Since the weights are substantially identical stampings, they will fit together in any desired number and in interchangeable stacking, and consequently the counterbalanced weights can be quickly and easily made up in any desired total weight for particular requirements of use.

As illustrated in Fig. 1, the wheel structure has the webs or ribs or spoke-like portions 5 adjacent to opposite edges of the rim portion 1, and in such wheel construction accurate balancing is accomplished by employing two counterbalance weights in accordance with my invention. In this adaptation, the weight is balanced across the width of the rim by applying two weights in line with one another, one weight to each side, with the weight of each equal to one-half of the total weight required for the desired counterbalancing effect.

While only particular constructions and embodiments of this invention have been illustrated and described, and only particular instances of installation and use have been shown, it will be appreciated that various changes can be made in the form, construction arrangement and assembly of the parts, and in the manner of application or use of the counterweight structure, without departing from the spirit and scope of this invention.

I claim:

1. A wheel counterbalance for use with a wheel having a rim and a plurality of spaced radially extending portions comprising, a balance weight, and a leaf spring having an unsprung length greater than the distance between said radially extending portions adapted to be sprung between and engaged at its ends with said portions.

2. A balancer for wheels having spoke-like radially extending portions and a rim, including a weight, and a bowed leaf spring connected medially with said weight and having its ends extending into engagement with adjacent spoke-like portions whereby the weight is held in place against the inner side of the rim.

3. A counterweight for balancing purposes comprising a weight having an opening through its middle portion, an elongated leaf spring provided with an opening, and means received through said openings assembling the spring with the weight and with the ends of the spring extending, said spring having gripping portions at its ends.

4. A counterweight for balancing purposes comprising a weight having an opening through its middle portion, an elongated leaf spring provided with an opening, and means received through said openings assembling the spring with the weight and with the ends of the spring extending, said weight having portions interfitting with the leaf spring and retaining said weight against twisting with relation to said spring.

5. A balancer for wheels comprising, an elongated leaf spring, a plurality of weight parts associated in a weight unit, and means connecting said weight unit at the middle portion of said spring and with the ends of the spring extending in opposed relation, said weight parts being provided with interfitting portions holding the weight parts in relative position and against turning with respect to said spring.

6. A counterweight for balancing purposes comprising an elongated bowed leaf spring member provided with an opening in its middle portion and having grip portions at its ends, a plurality of stamped out weight members each having an opening in its middle, said weight members being lanced on opposite sides of the opening in the provision of upstanding projections and being assembled with the openings thereof registering with each other and with the opening of the spring and with the lanced portions of the several stampings registering and the lanced portion of the stamping adjacent the spring member projecting on opposite sides thereof, and a rivet secured through the openings of said spring and the several stampings.

7. A counterbalance device adapted to be wedged between spaced wall structure of a wheel or the like, comprising a weight portion and an attachment portion in the form of an arcuate leaf spring having wall engaging outer end portions.

8. A counterbalancing device comprising a weight portion, an attachment portion connected to the weight portion and having a pair of resilient fingers adapted to be deflected in one direction to adjust the fingers to a supporting structure, and means on said fingers resisting movement of said device in an opposite direction along the supporting structure.

9. A counterbalance device as defined in claim 8 wherein said fingers are defined by an arcuate leaf spring centrally connected to said weight portion.

10. In a wheel structure having a radial wall structure, a counterbalancing device having a weight portion, a pair of resilient portions attached to said weight portion, said resilient portions being angularly disposed to yield in one direction to enable attachment movement relative to said wall structure, said resilient portions having means engaging with the wall structure to resist relative movement in the opposite direction.

FRANK H. LE JEUNE.